United States Patent
Viscardi et al.

(10) Patent No.: US 6,187,826 B1
(45) Date of Patent: Feb. 13, 2001

(54) DEVICE AND METHOD FOR THE REGENERATION OF MIXED ION EXCHANGE RESIN BEDS

(75) Inventors: Carlo Felice Viscardi; Marina Ausonio, both of Milan; Mauro Parenti, Triulzi, all of (IT)

(73) Assignee: Dibra S.p.A., Milan (IT)

( * ) Notice: Under 35 U.S.C. 154(b), the term of this patent shall be extended for 0 days.

(21) Appl. No.: 09/125,461

(22) PCT Filed: Feb. 13, 1997

(86) PCT No.: PCT/EP97/00670

§ 371 Date: Aug. 19, 1998

§ 102(e) Date: Aug. 19, 1998

(87) PCT Pub. No.: WO97/30788

PCT Pub. Date: Aug. 28, 1997

(30) Foreign Application Priority Data

Feb. 20, 1996 (IT) ................................................ MI96A0314

(51) Int. Cl.⁷ .............................. C08J 5/20; B01D 24/00; C02F 1/42

(52) U.S. Cl. ............................ 521/26; 210/674; 210/284; 210/296

(58) Field of Search .............................. 521/26; 210/674, 210/284, 296

(56) References Cited

U.S. PATENT DOCUMENTS

| 2,461,506 | 2/1949 | Daniel . | |
|---|---|---|---|
| 3,429,807 | 2/1969 | Burgess . | |
| 3,711,401 | * 1/1973 | Hamilton et al. | 210/34 |
| 3,933,631 | * 1/1976 | Adams | 210/34 |
| 4,017,262 | * 4/1977 | Small et al. | 23/253 R |
| 4,299,922 | * 11/1981 | Holl et al. | 521/26 |
| 4,622,141 | 11/1986 | Salem | 210/189 |
| 5,019,542 | * 5/1991 | Bento | 502/25 |
| 5,322,934 | 6/1994 | Kneller | 534/16 |
| 5,863,438 | * 1/1999 | Katzakian et al. | 210/674 |

FOREIGN PATENT DOCUMENTS

| 27 03 044 | 7/1978 | (DE) . |
| 28 00 194 | 7/1979 | (DE) . |

* cited by examiner

*Primary Examiner*—David W. Wu
*Assistant Examiner*—Tanya Zalukaeva
(74) *Attorney, Agent, or Firm*—Nixon & Vanderhye

(57) ABSTRACT

Equipment and procedures for regenerating ion exchange resin mixed beds, used for the desalination of water or of aqueous solutions from industrial processes (process solutions), that use two columns: the first treatment column (C1), containing a mixed bed of ion exchange resins, in which the cation exchange resins are regenerated, and a second column (C2) into which the anion exchange resins are transferred and regenerated, to be then reintroduced from the bottom into the above mentioned first column (C1), where they rise through the cation exchange resins and intimately mix with the anionic exchange resins.

8 Claims, 1 Drawing Sheet

Figure 1:
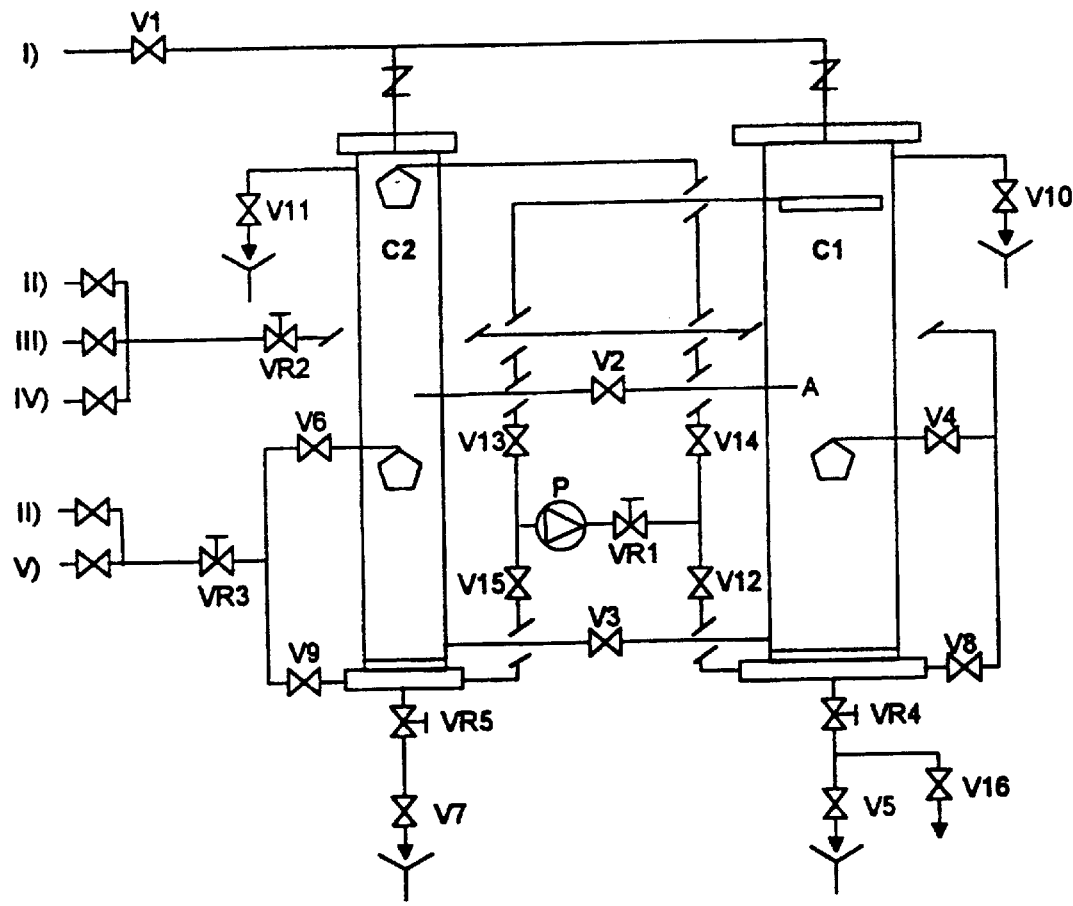

I) AIR INLET
II) DEIONIZED WATER INLET
III) HCl INLET
IV) INLET OF SOLUTION TO BE DESALINATED
V) NaOH INLET
VI) TRANSFER OPENING OF THE ANION EXCHANGER

DEVICE AND METHOD FOR THE REGENERATION OF MIXED ION EXCHANGE RESIN BEDS

This application is a 35 U.S. C. §371 of PCT/EP97/00670 filed Feb. 13, 1997.

This invention concerns a new device for regenerating mixed beds of ion exchangers used for the desalination of water or aqueous solutions deriving from industrial processes (process solutions) and the method of carrying out this regeneration.

The technique of desalination by means of mixed beds of ion exchanger resins, described for the first time in 1951 (U.S. Pat. No. 2,578,937), is now widely used for the production of very low ion content water: among the most important applications are the production of steam-boiler feed water and water for the electronic and pharmaceutical industries.

Another application of mixed bed processes concerns the desalination of process solutions containing non-ionic organic compounds, as, for example, molecules of pharmaceutical or foodstuffs interest. What characterizes mixed bed processes is the fact that water or the solution to be desalinated is percolated through an intimate mixture of a cation exchanger and an anion exchanger.

Mixed bed treatment allows the reduction of the residual saline content of treated water to quite lower levels as compared with desalination through separate beds of two ion exchangers; in fact, whereas in the case of separate beds, the fraction of ions removed is limited by the equilibrium value corresponding to the maximum degree of regeneration of the ion exchangers and hardly exceeds 99%, in the case of a mixed bed there are no theoretical limits to the fraction of ions removed.

Furthermore, whereas during the treatment, for example, through separate beds of cationic and anionic exchangers connected in series, the pH of the treated solution falls to very low levels in the column containing the cationic resin, in the mixed bed pH remains near to neutral. This characteristic allows, for example, the desalination of solutions of pH sensitive molecules.

Opposed to these advantages, the regeneration of mixed beds after use is unfortunately till now much more complex and costly than with separate beds, because the cation exchangers and the anion exchangers must be separated before regeneration, which is carried out with acids and bases respectively and then they must be homogeneously remixed after regeneration.

Separation and regeneration of exhausted mixed beds has been described for the first time in U.S. Pat. No. 2,771,424 (1956). A monography of recent processes was reported by B. Coulter, Ultrapure Water, November, 1987.

In all regeneration processes, the resins are separated by hydraulic classification by utilizing the different densities and granulometries of the two exchangers.

Once separated, the resins can be regenerated in the same column which contained the mixed bed (internal regeneration) or one or both of them can be transferred into one or more different columns where regeneration is carried out (external regeneration); they are then mixed in a special mixer (or even in the column used for the regeneration of the cation exchanger) and then transferred into the column used for the mixed bed. Another possibility consists in transferring said resins, after regeneration, into the column used for the mixed bed and mixing them therein.

The external regeneration procedure requires a much more complex plant, and is therefore normally used only for the final desalination of water to be fed to steam-boilers in thermoelectric or thermonuclear power stations.

The most widely used process for small or medium sized units is the internal regeneration. In this latter case the reagents for regeneration of the anion and the cation exchangers enter the column from the top and bottom respectively, either simultaneously or at different times (regeneration of the anionic exchanger is normally carried out first), while the exhausted regenerating solutions are collected from the same discharge line provided with devices (strainers) able to retain the portion of resin situated near the interface between the resins.

This system is less costly but has two significant disadvantages:

1) the interface between the resins must be exactly maintained at the level of the discharge line, otherwise a part of the anionic exchanger will be saturated by the acid used for the regeneration of the cationic exchanger or, vice versa, a part of the cationic exchanger will be saturated by the base used for the regeneration of the anionic exchanger.

This fact implies that it is not possible to handle a mixed bed with quantities of cationic resin different from those of the original design and that each variation of volume of the cationic resin, either due to the normal swelling occuring during regeneration or to a possible loss of resin, will have negative effects on the following performance of the bed;

2) even if the level of the interface is maintained at the level at which the discharge line has been installed, there will always be a certain mixing between the two regenerating liquids or between one regenerating liquid and the barrier water, in a substantial volume around the interface between the resins.

Both problems 1 and 2 cause incomplete regeneration of that portion resins which is near to the interface; it means that a part of the anionic resin will be saturated with the cationic resin regeneration liquid and vice versa. This implies a lower exchange capacity in the regenerated resins at equal volumes and consumption of regenerating liquid; furthermore, the portion of saturated anionic resin will release sulphate or chloride ions and the portion of saturated cationic resin will release sodium ions, so affecting the quality of water produced in the successive desalination process (see e.g. G. J. Crits, Ion Exchange, Technology of Mixed Beds, Ultrapure Water, November, 1984).

These disadvantages can be reduced by introducing into the mixed bed, other than the two ion exchange resins, an inert separator consisting, for example of inert small beads with an intermediate density between those of the two resins.

During hydraulic classification, the separator positions itself between the two resins distancing them from the zone where mixing of the two regeneration reagents takes place.

In this way, the partial saturation of the anionic resin is reduced as well as the criticality of the level of the cationic resin, but the desalination capacity per unit volume of bed will be inferior because the inert separator occupies a portion of the column volume.

On the contrary, external regeneration eliminates all of the problems related to imperfect separation of the regenerating reagents in such way assuring greater exchange efficiency, an improved degree of purity of the treated water and better repeatability of the desalination process: a recent mixed bed process with external regeneration is, for example, described in U.S. Pat. No. 4,472,282.

On the other hand, transferring the resins involves, as has already been pointed out, complex equipments and troublesome handling of the same and long overall regeneration times, thus making this method economically feasible only for the treatment of big volumes of water, already with a very low salt content.

Consequently, the equipment complexity is justified only for big plants and such operational work and long regeneration times are only acceptable when infrequent regeneration cycles (see e.g. B. L. Coulter, art. cit.) are required.

Another critical point in all mixed bed processes is the homogeneous mixing of the ion exchange resins once the regeneration is carried out. It is well known that the quality of water produced and the working capacity of the bed, largely depend on the quality of the mixing which must be as homogeneous as possible (see e.g. E. G. Baeva et al., Development of a System for Mixing Ion Exchangers, Teploenergetika, 1968).

In the devices known in the state of the art, mixing is always obtained by fluidizing the bed by counter-washing with water and then blowing air from the bottom of the column. This method is also applied in external regeneration units, with the sole difference that in the latter case, mixing is sometimes effected in a special apparatus instead of in the column dedicated to the mixed bed.

Mixed beds obtained by this procedure can be, and usually are, lacking in homogeneity: in general, the upper part of the bed consists almost exclusively of the lighter anionic resin and the lower part almost exclusively of the cationic resin (data concerning lack of homogeneity in mixed beds are given by Baeva and S. Fisher, Trouble Shooting in Mixed Bed Ion Exchange, Ultrapure Water, July-August, 1992). Only the central portion contains both resins mixed in quantities approaching the optimal ratio; however, if, for example, transparent columns are used, a simple optical analysis shows that even in this portion, homogeneity is not optimal: relatively large portions (of the order of 0.5 L in a 40 L bed) in which cation exchangers prevail, alternate with zones of the same size in which anion exchangers prevail.

In conclusion, available mixed bed techniques at the current state of the art, have disadvantages as compared to the conventional treatment with two or more separate beds, which are tied on the one hand to greater plant and operational complexity (above all if external regeneration is used) and on the other hand to high handling costs and, as a consequence, are competitive for the production of ultrapure water or of process solutions with very low ionic content, only in the case of solutions with already very low saline content, usually lower than that found in well water.

On the other hand, separate bed processes are not normally usable to produce water or process solutions with a conductivity of less than 0.5 $\mu$S/cm. Consequently, the production of water with very low conductivity (that is less than 0.5 $\mu$S/cm, preferably less than 0.25 $\mu$S/cm or even 0.08 $\mu$S/cm, such as for example for thermonuclear plants) normally requires two treatment steps, in which only the second is carried out with a mixed bed.

Furthermore, internal regeneration processes are normally used for small mixed beds and as has been previously stated, they are rather unsatisfactory, even for the quality of the deionized water produced in each successive phase.

It is to the subject of this invention a new device for the regeneration and mixing of ion exchangers resins in a mixed bed and method for operating it. This handling is much simpler in comparison to the units with external regeneration of the present state of the technology, it maintains all of their advantages and even increases their performance, in particular thanks to the greater homogeneity of the mixed bed obtained by said method.

A further object of this invention is the method described below for the preparation of a mixed bed of ion exchangers, characterized by great homogeneity. This process does not require the use of air for mixing the resins and is applicable to units with external regeneration.

The simplicity and versatility of the plant object of this invention, make it usable even for small or medium sized applications and even in processes which require frequent regeneration, for the first time rendering possible, and economic, to obtain purified water with a purity degree similar to those obtained by the best units with external regeneration, even when starting from well-water or even from sea-water.

The mixed bed obtained by the method and the plant object of this invention, is furthermore able to reduce inorganic and organic ionic impurities to extremely low levels in aqueous solutions of neutral organic products (for example, molecules of pharmaceutical interest and their intermediates or sugar solutions or food products).

The scope and advantages of the device and the method according to the invention are reached with the characteristics listed respectively in independent claims 1 and 6. Advantageous applications of the invention appear in the dependent claims.

Substantially, according to the invention, two columns are foreseen: a first treatment column containing the mixed bed of ion exchange resins, in which the cation exchange resins are regenerated after the treatment/desalination process, and then a second column into which the anion exchange resins are transferred and regenerated, to be then reinserted at the bottom of the first column where they rise through the cation exchange resins present therein, intimately mixing themselves with these, to give a reconstituted homogeneous mixed bed.

Further characteristics of the invention will be made clear by the detailed description which follows, which refers to one of its purely exemplary forms, therefore not limitative, and which is illustrated in the annexed FIG. 1, in which:

FIG. 1 is a scheme of the device for the regeneration of fluidized beds according to the invention.

Referring to this figure, the device object of this invention, consists substantially of two columns, one of which, indicated by C1 is dedicated to contain the mixed bed and to the regeneration of the exhausted cationic exchanger. The other, indicated by C2, is dedicated to the regeneration of the exhausted anionic exchanger, said columns being joined according to the diagram in FIG. 1. In the device of FIG. 1 in which the salient characteristics are shown, the open and close type valves are indicated with the term V, the regulation valves with the term VR and the circulation pump with the term P.

The functioning of the device of the invention substantially follows the operations described below.

Initially, the anionic exchange resin is loaded into column C2 and the cationic exchange resin into column C1. Both of the exchange resins are regenerated separately and according to the supplier's instructions (for example, for the regeneration of the anionic exchanger a strong base is used, usually sodium hydroxide at 4% w/w, whereas for the regeneration of the cationic exchanger, a strong acid is used, normally hydrochloric acid at 8 to 12% w/w or sulphuric acid at the same concentration).

For the cation exchanger, the acid solution is fed to C1 through valve V4, simultaneously discharging the exhausted regenerating solution through valve V5 and regulating VR4 to maintain the liquid just above the level of the resin. Similarly, for the anion exchanger, the alkaline solution is fed to C2 through V6, discharging the exhausted regenerating solution through V7 and regulating VR5 to maintain the liquid just above the level of the resin.

After regeneration, the ion exchangers are thoroughly washed with deionized water through the same hydraulic circuits. Upon completion of the washing (which can be determined on the basis of the conductivity of the eluate or on the total volume of water used), both resins are counterwashed with the flow recommended by the supplier for an expansion of between 25% and 100% of the initial volume, supplying deionized water through valves V8 and V9 respectively and first discharging the air and then the water through valves V10 and V11 respectively. At the end of this phase, the counter-washing is continued in C2, whereas it is stopped in C1 by closing V8 and V10.

The cation exchange resin bed in C1 is again fluidized by opening valves V12 and V13, starting the pump P and regulating the valve VR1 to obtain the flow necessary to expand the bed of cation exchange resin up to 200%–400% of its initial volume. Valves V9 and V11 are then closed and V1 is opened to pressurize the columns.

Valve V12 is closed then valve V14, which changes the flow of pumped water from C1 to C2, is opened simultaneously to V3, which causes the anionic resin to be transferred from C2 to C1.

In this way, the flow of water pumped through V14 pushes the fluidized bed of the anion exchanger through V3 and into column C1 where the anionic resin, which is lighter than the cationic resin, rises through the fluidized bed of the cation exchanger mixing itself intimately with it.

When the anion exchanger has been transferred into C1, the pump P is stopped, valves V13, V14 and V3 are closed and the fluidized mixed bed, just obtained after the transfer of the anion exchanger from C2 to C1, is compacted by rapidly discharging water through valve V5. Valve V5 is closed when the level of water in the column is just a little above the level of the resin.

The mixed bed obtained by this process results extraordinarily homogeneous as compared with those obtained by known methods (such as, for example, counter-washing with water and blowing air into the bottom of the column). The two resins are found to be homogeneously mixed for at least 80% of the column length (preferably for at least 90%); minimal non-homogeneous residual zones are observed only at the top of the column.

At this point, column C1 contains the regenerated mixed bed onto which the solution to be desalinated can be loaded (through V4); the resulting desalinated water (ultra-pure water or desalinated solution of organic compounds) is collected through valve V16. When the conductivity of the desalinated solution is above the level of acceptability established for the type of occuring purification, or when a predetermined volume of solution has been treated, the desalination phase is stopped and the separation of the resins is begun for the regeneration of the same.

To this effect, column C1 is filled with water, through V8 for example, closing V1 and venting the air through V10; when the column is full, V10 is closed and valves V1, V2, V15, and V12 are opened; the pump P is started and valve VR1 is gradually opened. In this way, the mixed bed in C1 is fluidized and the lighter anionic resin gradually separates out, above the cationic resin. When the flow, regulated by VR1 is increased, the upper part of the anionic fluid bed reaches the resin transfer line and begins to pass over into column C2 through valve V2, together with the flow of fluidization water. Valve VR1 is gradually opened to give the flow necessary to expand the cation exchanger to a level just below the transfer opening of the anion exchanger (indicated by A in FIG. 1): valve V13 can be opened (partially or completely) to reach the maximum flow without excessive loss of load in the anion resin bed in C2.

When all of the anion exchanger is transferred into C2, the step is terminated by stopping the pump P and closing the valves which were opened at the beginning of the transfer. The technicians can then proceed with emptying excess water from the columns and with the regeneration of the ion exchangers by the procedure which has already been described.

In a variant of the invention, before the separation of the resins is started, a quantity of 4–12% w/w hydrochloric acid, greater than that required for the regeneration of the cation exchanger, is fed into the mixed bed in C1. In this case, after the separation, there will be no need to regenerate the cation exchanger.

Apart from an increased acid consumption, this variant brings an easier and more complete separation of the ion exchangers and is often advantageous in cases of desalination of concentrated solutions of organic molecules.

The device and the method object of this invention, are very useful in the pharmaceutical field, for example, because they consent to reduce the amount of inorganic and organic ionic impurities to extremely low levels in aqueous solutions of drugs and of diagnostics agents. Among these, it is worthwhile to mention compounds of non-ionic type, such as, for example, iodinated contrast agents for radiography or paramagnetic contrast agents for magnetic resonance imaging (MRI), products which often must be administered in particularly high concentrations and for which an high degree of purity is essential.

Among the neutral iodinated contrast agents for radiography, the following can be, by way of an example, mentioned iopamidol, iomeprol, iohexol, ioversol, iopentol, iopromide, ioxilan, iotriside, iobitridol, iodixanol, iofratol, iotrolan, iodecimol, iopirol, iopiperidol.

Among the neutral paramagnetic contrast agents for MRI particularly preferred resulted to be the gadolinium complex of 10-(2-hydroxypropyl)-1,4,7,10-tetraazacyclododecane-1,4,7-triacetic acid (gadoteridol).

The following examples are intended to illustrate the best experimental conditions in which to apply the method, subject of the invention.

EXPERIMENTAL SECTION

EXAMPLE 1

In a device according to the preceding description and to FIG. 1, the columns C1 and C2, which have effective volumes (measured from the support plate to the height of the feed distributor) of 36 and 22 L, were loaded respectively with 12 L of sulphonic cation exchanger Rohm & Haas Amberjet® 1200 Na and with 22 L of strong anion exchanger, type I Rohm & Haas Amberjet® 4200 Cl. The ion exchangers were regenerated respectively with 26 kg HCl 10% w/w at a flow of 40 L/h and with 135 kg of sodium hydroxide 4% w/w at a flow of 90 kg/h. Both of the ion exchangers were then washed with deionized water until the eluate conductivity fell below 50 $\mu$S/cm. Then the anion exchanger was transferred to C1 and mixed with the cation exchanger according to the method subject of this invention. To the mixed bed so prepared, were fed 100 L of a solution of 1.3 kg (22 mol) of NaCl in 100 L of water (conductivity 28,000 $\mu$S/cm) at a rate of 100 L/h.

The conductivity of the treated water was, at the beginning, a little less than 1 $\mu$S/cm but rapidly fell, becoming stable, at 0.1 µS/cm until 80 L of water had been treated. The conductivity then rose very rapidly until it went out of the limit of the instrument (3,000 µS/cm) indicating that the bed was exhausted.

In order to have a measure of the total capacity up to saturation of the ion exchangers, feeding of the saline solution was continued until the end and the eluate was collected in a second fraction. Then the mixed bed was washed with deionized water to a conductivity of 100 µS/cm, still collecting the eluate in fraction 2.

The total capacity of the anion and cation exchangers was determined by dividing the molar quantity of exchanged ions by the volume of the anion and cation exchangers. The molar quantity was obtained deducting from the total quantity of sodium chloride fed, respectively, the total quantity of chloride ions determined with silver nitrate in fraction 2 and the difference between the total quantity of chloride ions and the free acidity titrated with caustic soda.

The total capacity of the anion exchanger resulted to be 0.84 mol/L (referred to the exchanger volume in the form of chlorine) and that of the cation exchanger 1.7 eq/L (referred to the exchanger volume in the form of Na), in accordance with what declared from the ion exchanger manufacturer.

The effective capacity of the mixed bed (defined as the quantity of ions fixed before the conductivity rises above 0.5 µS/cm) resulted to be 17.6 eq., which, when referred to the quantity of anion exchanger corresponds to 0.8 eq/L. This value is very high, in fact better than that foreseen on the basis of the data supplied by Rohm & Haas for a unit which uses separate beds (Amberjet 4200 Cl co-flow engineering data).

EXAMPLE 2

For purposes of comparison, the same ion exchangers from Example 1 were loaded into two separate columns, regenerated in the same conditions, counter-washed and washed with deionized water to the same final conductivity.

The two columns were joined in series in such a way that the anion exchanger followed the cation exchanger.

A solution of sodium chloride in water in the same quantities as in Example 1 was fed to the two columns at a rate of 100 L/h.

The conductivity of the treated water was initially a little less than 50 µS/cm, but rose moving up to 100 and then to 300 µS/cm up to 70 L of treated water (pH alkaline). The conductivity then went out of the limit of the instrument (3,000 µS/cm) indicating that the deionizer was exhausted.

As in the previous example, in order to have a measure of the total capacity up to saturation of the ion exchangers, feeding of the saline solution was completed the eluate was collected in a second fraction.

Then the in series beds were washed with deionized water to a conductivity of 100 µS/cm still collecting the eluate in fraction 2.

Whereas the total capacity of the exchangers, determined by the same method as in Example 1, resulted practically identical to that of Example 1, the effective bed capacity (defined in this case as the quantity of ions fixed before the conductivity rises above 400 µS/cm) resulted to be 0.68 eq/L.

This value is near to that expected, based on data supplied by Rohm & Haas for a separate bed unit like the one in this example (Amberjet 1200 Na co-flow engineering and Amberjet 4200 Cl co-flow engineering).

The considerable advantages assured by the unit of Example 1 appear evident, both in terms of quality of the treated water and of capacity before exhaustion, at equal reagent consumption.

EXAMPLE 3

Desalination of a concentrated solution of N,N'-bis (2,3-dihydroxypropyl)-5-[(hydroxyacetyl) methylamino]-2,4,6-triiodo-1,3-benzene-dicarboxamide A) Solution of N,N'-bis(2,3-dihydroxypropyl)-5 [(hydroxyacetyl)methylamino]-2,4,6-triiodo-1,3-benzene-dicarboxamide.

90 kg of N,N'-bis(2,3-dihydroxypropyl)-5-[(hydroxyacetyl)-methylamino]-2,4,6-triiodo-1,3-benzene-dicarboxamide obtained by the procedure described in EP 185130 were suspended in 400 L of deionized water and heated under reflux. 310 g of 30% w/w sodium hydroxide were added to the suspension. It was then heated to 120° C. under sealing conditions and this temperature was maintained for 1 hour. It was then cooled to 50° C. and 7.7 kg of 30% w/w sodium hydroxide were added gradually cooling to 40° C. over 2 hours. After a further 4 hours at 40° C., it was cooled to 20° C. and pH was adjusted to 5.5 with hydrochloric acid. The solution obtained was loaded onto 160 L of absorbent resin R&H Amberlite 1600, feeding the eluate to a nanofiltration unit equipped with a Desal DK4040 membrane. When the loading was completed, the resin was washed with 800 L of water at 40° C. collecting the eluate in the tank of the nanofiltration unit. During elution or at the end of it, the nanofiltration unit was started and the operation continued until the volume of the solution in the unit was reduced to about 200 L. At the same time, the elimination of the greater part of sodium chloride contained in the eluted solution was also obtained.

The obtained concentrated solution of N,N'-bis(2,3-dihydroxypropyl)-5-[(hydroxyacetyl)methylamino)]-2, 4,6-triiodo-1,3-benzene-dicarboxamide, which will from now on be referred to as solution A, contains 80 kg of the desired product, about 0.05 mol/L of organic ionic impurities (aromatic carboxylic acids) and 0.03 mol/L of inorganic salts (prevalently NaCl)

B) Desalination of solution A.

200 kg of solution A at 40% w/w were fed at a rate of 40 L/h to the same unit of Example 1, filled with the same quantities of the same ion exchangers, which were previously regenerated by the same method of example 1.

The eluate line was equipped with a conductivity analyser and also with a photometer to measure the absorbance at 280 nm, to detect the presence of organic substances in the eluant.

The eluate was discarded until its absorbance began to rise rapidly, indicating the presence of the organic product in question.

From this moment, the eluate was collected in a tank up to exhaustion of solution A.

During the collection of this fraction which contains the greater part of the organic product, the conductivity remained below 0.1 µS/cm.

When solution A was finished, the mixed bed was washed with 30 L of water at the same flow rate and then again with 150 L of water at a flow rate of 100 L/h always collecting the eluate in the same tank of the product fraction.

Even during this phase, the conductivity of the eluate remained very low.

The fraction corresponding with the desalinated product, which is free from chloride ions and carboxylic acids, was concentrated by evaporation to a viscous residue containing 15% of water. The product was then isolated in a practically pure form (99%) by the addition of absolute alcohol at reflux temperature, followed by cooling and filtration.

EXAMPLE 4

Regeneration of the Mixed Bed after Treatment of the Organic Solution of Example 3.

The mixed bed to be regenerated was counter-washed with 10 L of water. The water level was lowered to just above the level of the resin and then, through the feed-line were fed, firstly 60 kg of 8.5% w/w HCl at a flow rate of 40 kg/h and then 200 kg of deionized water, the first 30 L at the same flow rate and the remainder at a rate of 150 kg/h.

The cation and anion exchangers were then separated and the anion exchanger transferred to column 2, according to the description of this invention: the separation was found to be easy and clean-cut.

The anion exchanger was regenerated, washed and then retransferred to column C1 where it was mixed with the cation exchanger, exactly as described in Example 1.

EXAMPLE 5

Desalination test equal to that described in Example 3 on the regenerated mixed bed of Example 4

As a confirmation of the repeatability and reliability of the method object of this invention, the complete regeneration cycle according to Example 4 and desalination of a solution prepared according to point B of Example 3, were repeated 42 times without significant functional anomaly and with the same desalination efficiency.

EXAMPLE 6

Desalination of a solution of the non-ionic organic complex of Gadolinium of 10-(2-hydroxypropyl)-1,4,7,10-tetraazacyclododecane-1,4,7-triacetic acid.

100 kg of an aqueous solution containing 25 kg of the compound in question, (solution A'), obtained by the method described in patent application EP 292689, was fed at a rate of 40 L/h to the same unit of Example 1, filled with the same quantities of the same ion exchangers, previously regenerated according to the same method of Example 1.

The eluate line was equipped with a conductivity analyser and also with a photometer to measure the absorbance at 280 nm, to detect the presence of organic substances in the eluate.

The eluate was discarded until its absorbance began to rise rapidly, indicating the presence of the organic substance in question.

From this moment the eluate was collected in a tank until the solution was finished.

During the collection of this fraction which contains the greater part of the organic product, the conductivity remained below 0.1 $\mu$S/cm.

When solution A' was finished, the mixed bed was washed with 30 L of water at the same flow rate and then finally with 300 L of water at a flow rate of 100 L/h, always collecting the eluate in the same tank of the product fraction.

Even during this phase, the conductivity of the eluant remained very low and the fraction corresponding to the desalinated product was shown to be free from chloride ions.

What is claimed is:

1. A device for the regeneration of mixed beds of ion exchange resins, including cation exchange resins and anion exchange resins, contained in a first treatment column (C1) the device comprising:

means for the separation of the anion exchange resins from the cation exchange resins in said first column (C1) by fluidizing the mixed bed of resins which allows water to enter first column (C1) from the bottom, so that the lighter anion resins shift themselves on top of the cation resins;

means for the transfer of the anion exchange resins into a second treatment column (C2) which column is in fluid communication with the first column (C1) by a conduit including a transfer opening (A) in the first column (C1), at a level above that of the mixed bed, a conduit connecting said opening (A) to the second column (C2), intercepted by a valve (V2), and further comprising means for expanding the cationic resin in the first column (C1) up to a level just below said opening (A);

means for the regeneration of the cation exchange resins directly in the first column (C1);

means for the regeneration of the anion exchange resins in the second column (C2) transferring the regenerated anionic resins from the second column (C2) to the first column (C1) and preparing a homogeneous reconstitution of the mixed resins and fluidizing the bed by pumping water into the second column (C2);

said regeneration means consisting of an acid solution fed through a valve (V4), and the exhausted solution after regeneration is discharged through a valve (V5) the second consisting of an alkaline solution fed through a valve (V6), and the exhausted solution after regeneration is discharged through a valve (V7);

means for the transfer of the regenerated anionic resins from the second column (C2) to the first column (C1) comprising a conduit intercepted by a valve (V3), which joins said columns in the region of their respective bases and water pumped in the second column (C2) which transfers the bed of anionic resins into the second column (C1) where it rises through the fluidized bed of the cationic resins mixing itself intimately with them.

2. Method of regenerating mixed beds of ion exchange resins, comprising cation exchange resins and anion exchange resins, contained in a first treatment column (C1) having a top and a bottom, said method comprising the following successive steps;

(1) separating the anion exchange resins from the cation exchange resins in the first column (C1) by introducing water from the bottom of the first column (C1), to fluidize the mixed bed so that the lighter anionic resins rise above the cationic resins;

(2) transferring the anionic resins from the first column (C1) to the second column having a top and bottom (C2) through a conduit connecting said first column (C1) and second column (C2), the conduit positioned at a higher level than that defined for the mixed bed and expanding the cationic resin bed in the first column (C1) to a level just below that of the transfer line;

(3) regenerating the cation exchange resin directly in the first column (C1) by introducing an acid solution and in discharging the exhausted solution, maintaining the liquid level just above that of the resins;

(4) regenerating the anion exchange resin in the second column (C2);

(5) to the first column (C1) and preparing a homogeneous reconstitution of the mixed resins and fluidizing the bed by pumping water into the second column (C2) to push the bed of anionic resins through a conduit with valves and through the bottom of the first column (C1) where the bed of anionic resins rises through the fluidized bed of cationic resins mixing intimately with them.

3. The method according to claim 2, in which the cation exchange resins are regenerated prior to separating the anion exchange resins from the cation exchange resins.

4. The method according to claim 2, wherein the regeneration of the cation exchange resins takes place by introducing into the first column (C1) of an acid solution in quantities greater than those necessary for the regeneration of said cationic resins.

5. The method according to claim 4 wherein the acid solution contains 8% to 12% w/w hydrochloric acid or sulfuric acid.

6. The method according to claim 2, wherein the anionic resins are regenerated in column 2 (C2) by introducing an alkaline solution and discharging exhausted solution while maintaining the liquid level just above the level of the resins.

7. The method according to claim 4, wherein the alkaline solution contains 4% w/w sodium hydroxide.

8. The method according to claim 2, wherein after regeneration, the resins are washed with deionized water and counter-washed with deionized water thereby reaching an expansion of 25% to 100% of their initial volume.

* * * * *